United States Patent
Suzuki et al.

(10) Patent No.: US 11,988,238 B2
(45) Date of Patent: May 21, 2024

(54) BOLT AND FASTENING STRUCTURE

(71) Applicant: AOYAMA SEISAKUSHO CO., LTD., Niwa-Gun (JP)

(72) Inventors: Yuichiro Suzuki, Niwa-Gun (JP); Mitsuki Yoshida, Niwa-Gun (JP); Akihiro Furukawa, Niwa-Gun (JP); Yukinori Fujimoto, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 816 days.

(21) Appl. No.: 17/026,480

(22) Filed: Sep. 21, 2020

(65) Prior Publication Data

US 2021/0003163 A1    Jan. 7, 2021

Related U.S. Application Data

(63) Continuation of application No. PCT/JP2019/018468, filed on May 9, 2019.

(30) Foreign Application Priority Data

May 18, 2018    (JP) .................................. 2018-095857

(51) Int. Cl.
*F16B 35/00*    (2006.01)
*F16B 33/02*    (2006.01)
(Continued)

(52) U.S. Cl.
CPC ............ *F16B 33/02* (2013.01); *F16B 35/007* (2013.01); *F16B 33/008* (2013.01); *F16B 33/04* (2021.08)

(58) Field of Classification Search
CPC ..... F16B 35/007; F16B 39/30; F16B 25/0057
(Continued)

(56) References Cited

U.S. PATENT DOCUMENTS 2,371,365 A * 3/1945 Tomalis .................. F16B 39/30
411/929
3,351,115 A * 11/1967 Boehlow ............. F16B 25/0057
411/168
(Continued)

FOREIGN PATENT DOCUMENTS

EP        3 211 252 A1    8/2017
JP      H05-340415 A1    12/1993
(Continued)

OTHER PUBLICATIONS

Japanese Office Action (Applications No. 2018-095857) dated Dec. 7, 2021.
(Continued)

*Primary Examiner* — Flemming Saether
(74) *Attorney, Agent, or Firm* — BURR PATENT LAW, PLLC

(57) ABSTRACT

To threadedly engage a bolt and a female screw with each other, thereby making it possible to shave off a deposit on the inner surface of the female screw and to make it easy for a worker to sense the seating, there is provided a bolt including a shaft 2 and a head, wherein a first thread 11 is provided on a head side of the shaft, and at least one of a thread provided larger in diameter than the first thread and a thread provided wider than the first thread is provided on a tip end side of the shaft.

3 Claims, 6 Drawing Sheets

(51) Int. Cl.
*F16B 33/00* (2006.01)
*F16B 33/04* (2006.01)

(58) Field of Classification Search
USPC .......................................... 411/308, 168, 386
See application file for complete search history.

(56) References Cited

U.S. PATENT DOCUMENTS

| | | | | | |
|---|---|---|---|---|---|
| 3,489,195 | A | * | 1/1970 | Mortus | B21H 3/025 |
| | | | | | 411/301 |
| 3,664,400 | A | * | 5/1972 | Moore | F16B 39/30 |
| | | | | | 411/308 |
| 4,810,106 | A | * | 3/1989 | Ohike | G01P 1/00 |
| | | | | | 384/295 |
| 4,973,209 | A | * | 11/1990 | Essom | F16B 39/30 |
| | | | | | 411/416 |
| 5,188,496 | A | * | 2/1993 | Giannuzzi | F16B 25/0026 |
| | | | | | 411/386 |
| 5,499,895 | A | * | 3/1996 | Allen | F16B 35/047 |
| | | | | | 411/386 |
| 5,795,120 | A | * | 8/1998 | Hurdle | F16B 25/0047 |
| | | | | | 408/229 |
| 6,158,938 | A | * | 12/2000 | Savoji | F16B 35/047 |
| | | | | | 411/386 |
| 6,478,520 | B1 | * | 11/2002 | Sala | F16B 25/0021 |
| | | | | | 411/311 |
| 7,938,609 | B2 | * | 5/2011 | Mori | F16B 25/0021 |
| | | | | | 411/386 |
| 9,790,979 | B2 | * | 10/2017 | Torii | F16B 25/0073 |
| 9,903,405 | B2 | * | 2/2018 | Fujimoto | F16B 35/007 |

FOREIGN PATENT DOCUMENTS

JP   2014-037893 A1   2/2014
JP      3215000 U      2/2018

OTHER PUBLICATIONS

International Search Report and Written Opinion (Application No. PCT/JP2019/018468) dated Aug. 6, 2019.

* cited by examiner

BOLT AND FASTENING STRUCTURE

TECHNICAL FIELD

The present invention relates to a bolt and a fastening structure.

BACKGROUND ART

There is known a technique by which a coating film within a nut can be peeled off when a bolt is tightened, as described in Patent Literature 1. The bolt described in Patent Literature 1 is tapered and also axially grooved at a part on its tip end side. In the technique described in Patent Literature 1, it is intended to peel off a coating film with a thread on the tapered tip end side. However, in such a form, the thread on the tip end side and the coating film applied to a female screw do not come in contact with each other sufficiently, so that the coating film may not be peeled off sufficiently. In order to solve this problem, it is also conceivable to shave off a counterpart member with a head-side portion formed thick as in the tapping screw described in Patent Literature 2.

CITATION LIST

Patent Literature

[PTL1] JP H5-340415 A
[PTL2] JP 2014-37893 A

When a nut is tightened to a normal bolt, the tightening torque rapidly increases when the nut has been just seated, so that a worker can easily sense the seating. However, when a nut is tightened while a coating film or the like is removed with a thread on the head side, this is not the case because of a load involved in the removal. For this reason, there is a possibility that the worker cannot easily sense the seating.

SUMMARY OF INVENTION

Technical Problems

The present inventor made intensive studies to solve this problem. A problem to be solved by the present invention is to threadedly engage a bolt and a female screw with each other, thereby making it possible to shave off a deposit on the inner surface of the female screw and to make it easy for a worker to sense the seating.

Solutions to Problems

In order to solve the above problem, the present invention provides a bolt including a shaft and a head, wherein a first thread is provided on a head side of the shaft, and at least one of a thread provided larger in diameter than the first thread and a thread provided wider than the first thread is provided on a tip end side of the shaft.

Moreover, it is preferable to employ a structure in which the thread provided larger in diameter than the first thread and the thread provided wider than the first thread are provided on the tip end side of the shaft.

Moreover, it is preferable to employ a structure in which a thread provided with a notch is provided on the tip end side of the shaft.

Moreover, it is preferable to employ a structure in which a thread having a friction coefficient stabilizer applied thereto is provided on the tip end side of the shaft.

Moreover, it is preferable to provide a fastening structure in which the bolt described above and a female screw are threadedly engaged with each other for fastening.

Advantageous Effects of Invention

In the present invention, the bolt and the female screw are threadedly engaged with each other, thereby making it possible to shave off a deposit on the inner surface of the female screw and to make it easy for a worker to sense the seating.

DETAILED DESCRIPTION OF PREFERRED EMBODIMENT

Figure 1:
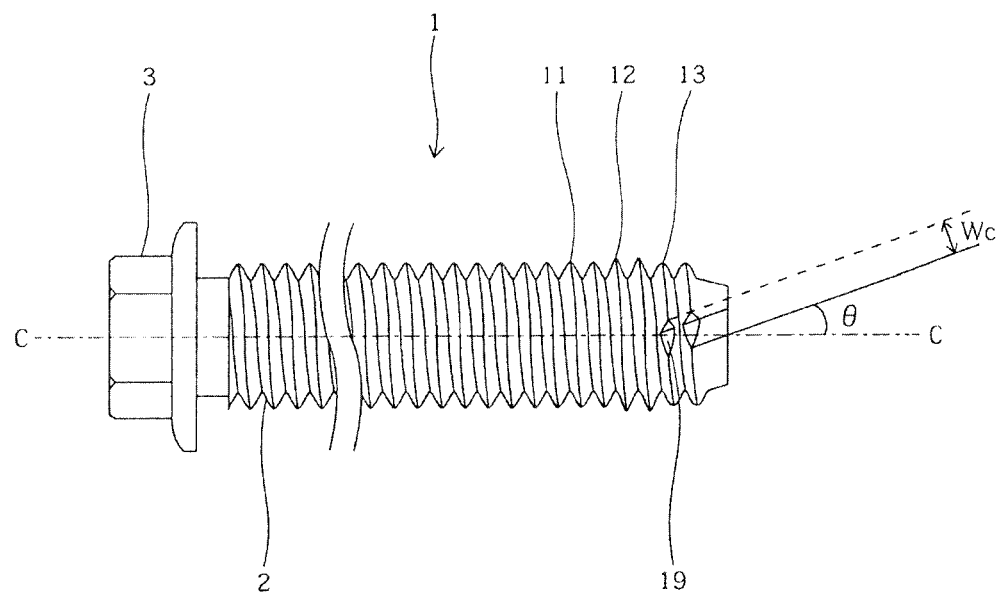
FIG. 1 is a side view of a bolt according to an embodiment.
Figure 2:
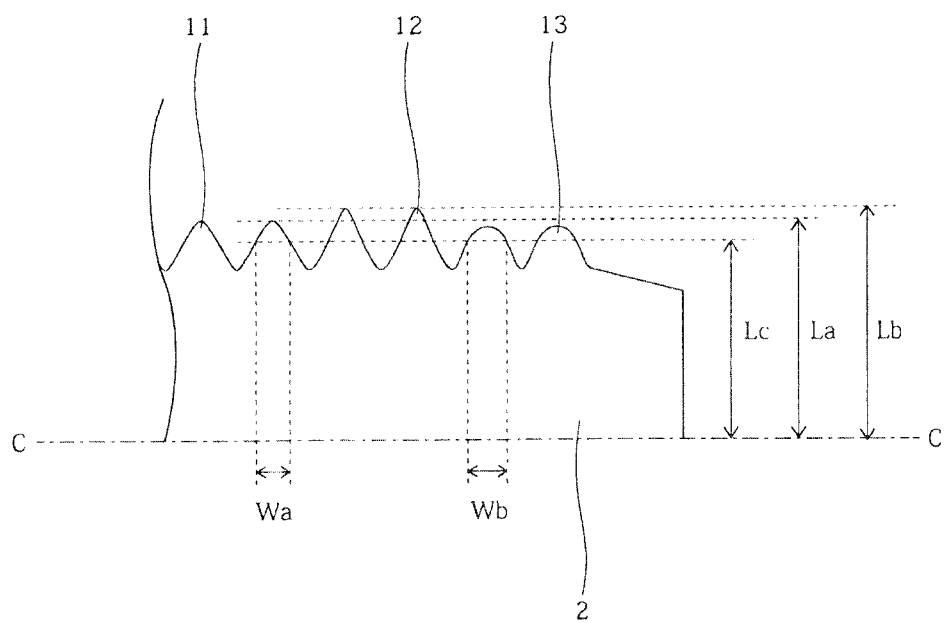
FIG. 2 is a diagram showing the width of first threads and the width of third threads at a position radially separated by a predetermined length from a central axis of the bolt. However, the diameter of the first threads and the diameter of second threads are also shown.

Hereinafter, an embodiment of the invention will be described. An iron bolt 1 for fastening will be described below as an example. As understood from what is shown in FIGS. 1 and 2, the bolt 1 of the embodiment includes a shaft 2 and a head 3, and a first thread 11 is provided on the head 3 side of the shaft 2. In addition, at least one of a thread provided larger in diameter than the first thread 11 and a thread provided wider than the first thread 11 is provided on the tip end side of the shaft 2. Therefore, the bolt 1 and a female screw 5 are threadedly engaged with each other, thereby making it possible to shave off a deposit on the inner surface of the female screw 5 and to make it easy for a worker to sense the seating.

The bolt 1 shown in FIGS. 1 and 2 is provided with the first thread 11 on the head 3 side of the shaft 2. In addition, the bolt 1 is provided with a second thread 12 larger in diameter than the first thread 11 and a third thread 13 wider than the first thread 11. The second thread 12 is provided larger in diameter than that of the third thread 13, and the third thread 13 is provided wider than the second thread 12. While the first thread 11 is used for threaded engagement with the female screw 5 which is usually performed, the second thread 12 and the third thread 13 are mainly used to peel off a deposit on the female screw 5.

Figure 3:
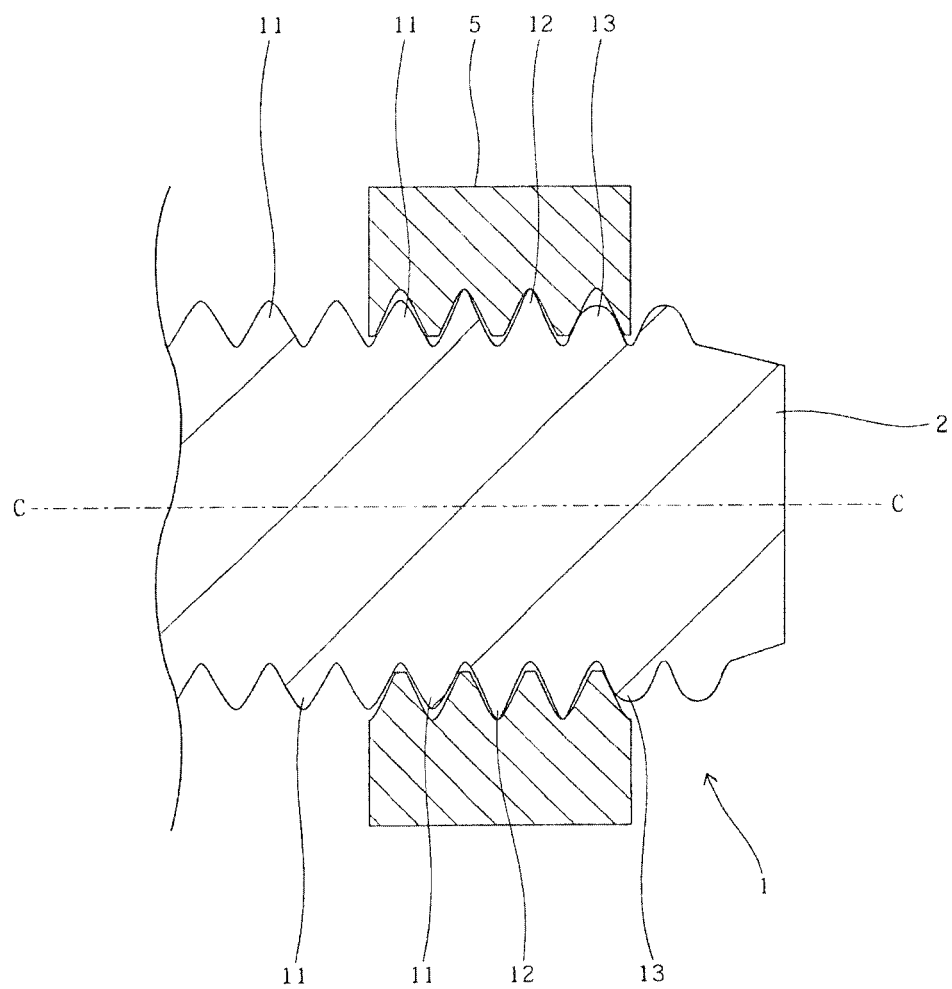
FIG. 3 is a conceptual diagram showing a gap formed between the respective first threads and a female screw, a gap generated between the respective second threads and the female screw, and a gap generated between the respective third threads and the female screw. However, the first threads, the second threads, and the third threads are sequentially provided from the head toward the tip end side of the shaft.

Here, the first thread 11, the second thread 12, and the third thread 13 will be compared and described. As shown in FIG. 2, a radius Lb of the second thread 12 is formed larger than a radius La of the first thread 11. More specifically, the diameter of the first thread 11 is usually formed to be equal to the value defined by the nominal diameter, but the diameter of the second thread 12 is formed to be larger than the diameter of the first thread 11. By making the radius Lb of the second thread 12 larger than the radius La of the first thread 11, it is made easy to peel off a deposit on the valley bottom side of the female screw 5, and the contact of the radial tip of the first thread 11 with the deposit can be suppressed. Therefore, as understood from what is shown in FIG. 3, the second thread 12 is different from the first thread 11 in terms of the contact position with the female screw 5, so that a gap between the male screw and the female screw 5 can be reduced. The radius Lb of the second thread 12 is formed smaller than the valley radius of the female screw 5. The radiuses of all the threads provided in the bolt 1 are smaller than the valley radius of the female screw 5, thereby making it possible to suppress an excessive load when the bolt 1 is tightened.

Further, at a position separated from a central axis C by a predetermined distance Lc, a width Wb of the third thread 13 is wider than a width Wa of the first thread 11. In the example shown in FIGS. 1 and 2, the width Wb of the third thread 13 is wider than the width Wa of the first thread 11, for the entire flank. For this reason, the third thread 13 can be made smaller than the first thread 11 in terms of the gap with the female screw 5, as understood from what is shown in FIG. 3. If the width Wb of the third thread 13 is longer than the width Wa of the first thread 11 from the position separated by the distance over a range from the central axis C of the shaft 2 to the valley bottom to the position separated by the length of a radius Lc of the first thread 11, the deposit on the inner surface of the female screw 5 can be shaved off more effectively.

In addition, the female screw 5 is formed by applying a coating to a metallic female screw body. When the female screw 5 is threadedly engaged with the bolt 1, the width Wb of the third thread 13 of the bolt 1 is shorter than the distance between the flank surfaces of the adjacent threads in the female screw body at the position radially separated by the predetermined length Lc from the central axis C of the shaft 2. For this reason, it becomes possible to peel off the coating film, while suppressing the damage of the female screw body by the third thread 13.

In the case of the bolt 1 shown in FIGS. 1 and 2, it is possible to first peel off the deposit on the female screw 5 with the thread provided wider and then peel off the deposit with the larger-diameter thread. For this reason, the deposit adhering onto the female screw 5 becomes easy to be removed effectively.

The first threads 11 which occupy a majority of the threads of the bolt 1 according to the embodiment are formed so as to be equal, in diameter and width, to general threads. Further, on the tip end side of the shaft 2 of the bolt 1 shown in FIGS. 1 and 2, there are provided two pitches of the larger-diameter threads which serve as the second threads 12 and two pitches of the wider threads which serve as the third threads 13. The numbers of pitches of the second threads 12 and the third threads 13 are not limited, but are preferably smaller than the number of pitches of the first threads 11. In the bolt 1 shown in FIG. 1, the pitches of the first threads occupy more than half of the pitches of all the threads.

Figure 4:
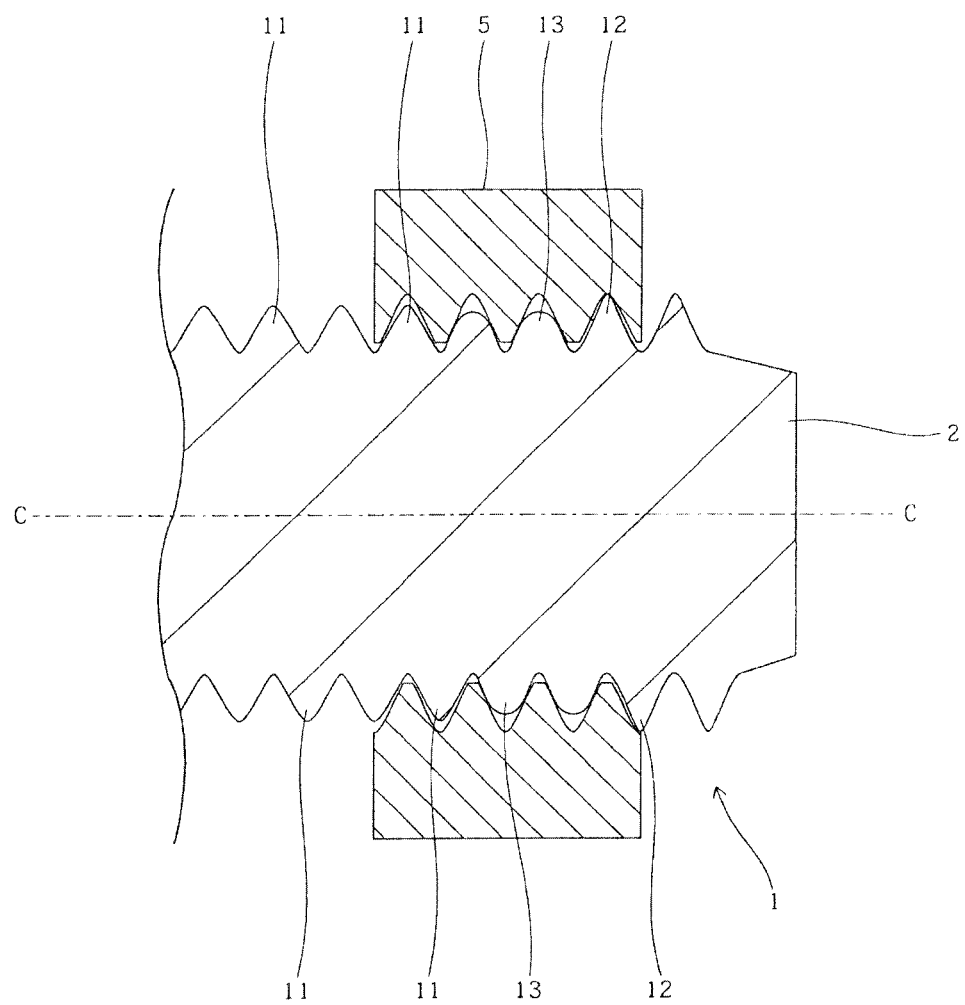
FIG. 4 is a diagram showing an example in which the female screw is attached onto a bolt in which the first threads, the third threads and the second threads are sequentially provided from the head toward the tip end side of the shaft.
Figure 5:
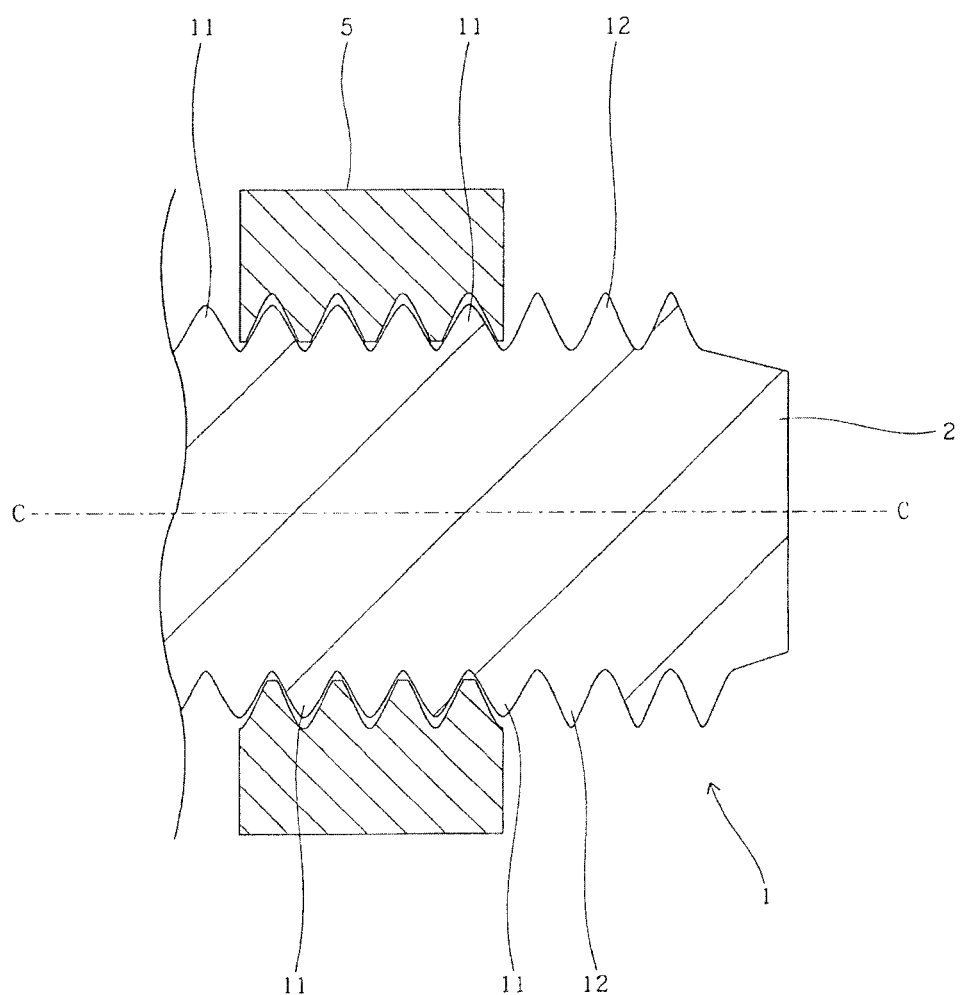
FIG. 5 is a diagram showing an example in which the female screw is attached onto a bolt in which the first threads and the second threads are sequentially provided from the head toward the tip end side of the shaft.
Figure 6:
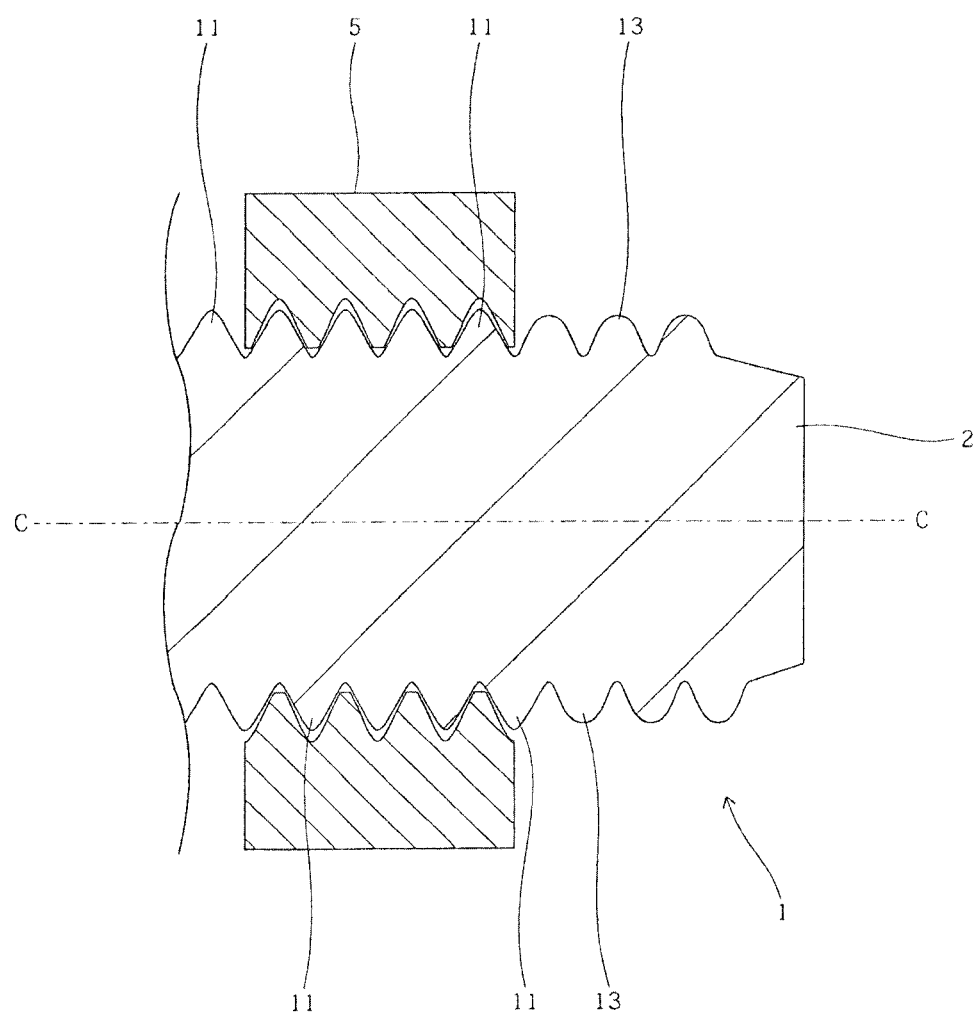
FIG. 6 is a diagram showing an example in which the female screw is attached onto a bolt in which the first threads and the third threads are sequentially provided from the head toward the tip end side of the shaft.

It is not necessary to provide the wider third threads 13 on the tip end side of the shaft 2 as compared with the larger-diameter second threads 12, and, as shown in FIG. 4, the larger-diameter second threads 12 may be provided on the tip end side of the shaft 2 as compared with the wider third threads 13. In addition, there may be employed a form in which the larger-diameter second threads 12 are provided, but no wider third thread 13 is provided as shown in FIG. 5, or a form in which the wider third threads 13 are provided, but no larger-diameter second thread 12 is provided as shown in FIG. 6.

The bolt 1 of the embodiment is provided with a notch 19 on the tip end side of the shaft 2. The notch 19 functions to positively remove the deposit adhering onto the female screw 5 and to discharge the removed deposit from the tip end side of the bolt 1. This notch 19 may be formed to extend in the same direction as the longitudinal direction of the shaft 2, but is preferably formed so that, in the side view, the angle θ formed by the longitudinal direction of the notch 19 and the central axis C is 20 to 45° (see FIG. 1). Further, it is preferable to provide a plurality of notches 19. In the embodiment, three notches 19 are provided so as to be spaced in the circumferential direction. Preferably, no other notch 19 is arranged at a position shifted by 180 degrees in the circumferential direction of the shaft 2.

If the width Wc of the notch 19 is too small, the deposit to be removed cannot be stored sufficiently in the notch 19, and the deposit that cannot be stored will get out from the notch 19, which can serve as a resistance when the female screw 5 is tightened. In addition, too large the width Wc of the notch 19 may deteriorate the function as a guide for discharging the deposit. Therefore, the notch 19 preferably has a width Wc of about 1 to 3 mm. The length, in the longitudinal direction, of the notch 19 is preferably less than 50% of the nominal diameter of the bolt 1.

Further, in the embodiment, a friction coefficient stabilizer is applied to the tip end side of the shaft 2 of the bolt 1. This friction coefficient stabilizer is intended for smooth threaded engagement with the female screw 5 such as a nut, and examples thereof include wax. The application of the friction coefficient stabilizer can suppress an increase in tightening load, for example, due to a reduction in the gap with the female screw 5. The friction coefficient stabilizer may or may not be applied to the first thread 11. The friction coefficient stabilizer may have any other function such as corrosion resistant function.

Figure 7:
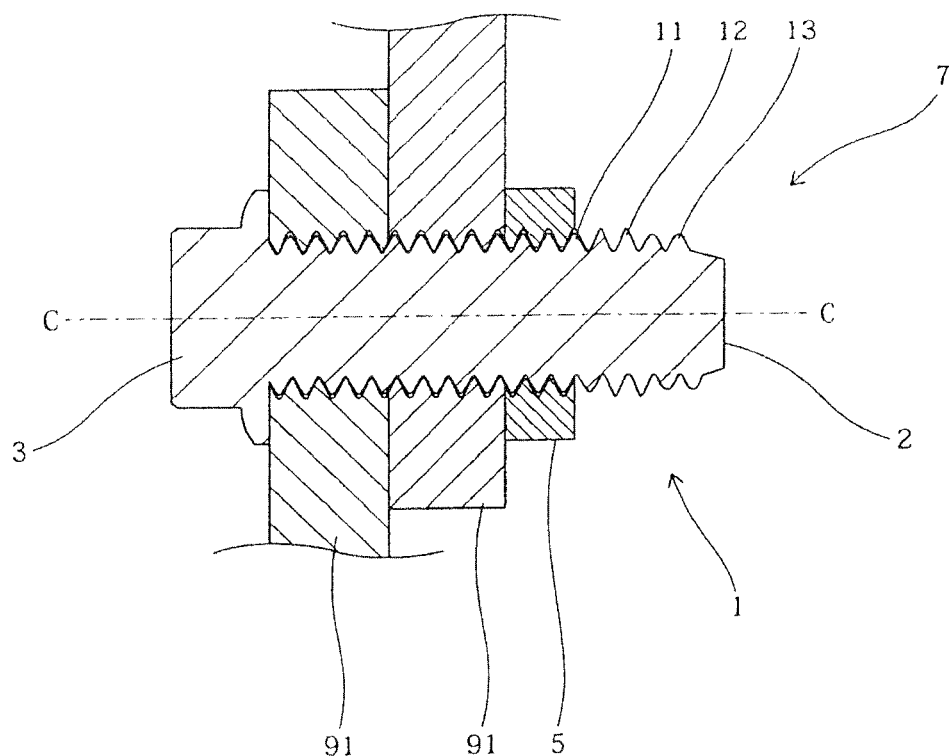
FIG. 7 is a diagram showing a state in which members are fastened by the bolt shown in FIG. 1 and a nut.

As shown in FIG. 7, if threadedly engaging the nut having a deposit with the bolt 1 of the present invention to fasten a plurality of members 91, a worker can easily sense the completion of the fastening, and thus can appropriately perform the work.

In the case of a fastening structure 7 in which the female screw 5 is threadedly engaged with the bolt 1 of the present invention for fastening, the movement of the female screw 5 is suppressed due to the presence of a thread larger in diameter or wider than the first thread 11, with the result that the falling-off or loosening of the female screw 5 can be suppressed. Further, the deposit such as a coating film on the female screw 5 is peeled off with the bolt 1 of the present invention for fastening, thereby enabling metal touch between the bolt 1 and the female screw 5 and ensuring conduction.

Here, the relationship between the rotation angle and the torque when the bolt 1 of the present invention and a coated nut are used as fastening members will be described. The bolt 1 of the present invention, when rotated, will be screwed into the nut while the coating film adhering onto the nut will be shaved off with the second thread 12 formed larger in diameter or the third thread 13 formed wider than the first thread 11. At this time, a screwing torque for screwing the second thread 12 or the third thread 13 into the nut is generated. However, when the nut goes over such a thread, the screwing torque is eliminated (see the solid line in FIG. 8). For this reason, the load on the worker when turning the bolt 1 or the nut is sufficiently reduced.

The bolt 1 or the nut, when further turned, will be seated, and further rotation thereof becomes difficult. By using the bolt 1 of the present invention, the load when rotating the bolt 1 or the nut rapidly increases, whereby the worker can sense the seating. It is preferable that the nut in the seated state be in contact with the first thread 11 without being in contact with the second thread 12 or the third thread 13, but, if the nut is slightly contacted with the second thread 12 or the third thread 13, such contact may be permitted.

Figure 8:
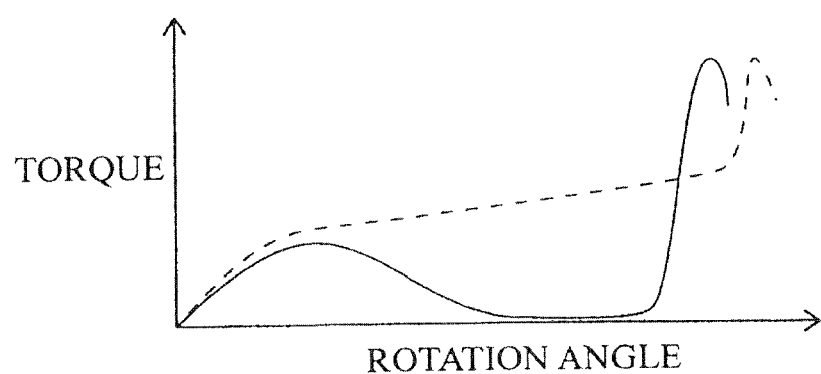
FIG. 8 shows the relationship between the rotation angle of the bolt and the torque. In this figure, a solid line relates to the bolt according to the present invention, and a broken line relates to a bolt having a smaller diameter on the tip end side and a larger diameter on the head side.

On the other hand, in the case of a bolt of a comparative example having a smaller diameter on the tip end side and a larger diameter on the head side, there is almost no gap between the bolt and the female screw, so the load required for rotation increases with increasing rotation angle (see the broken line in FIG. 8). For this reason, even when the seating state has been achieved, it is difficult for the worker to sense the seating. In addition, since the tightening torque required for achieving the seating becomes large, a burden is placed on the worker. Furthermore, the time taken for the tightening operation was longer in the case of the bolt of the comparative example than in the case of the bolt 1 of the present invention.

The present invention has been described above using the embodiment, but is not limited to the embodiment described above, and various modes can be adopted. For example, the material for the bolt does not have to be iron, and may be another material. However, the bolt is preferably made of metal.

Further, the material to be peeled off by the bolt is not limited to the coating film, and may be sputtering or burrs.

Further, the counterpart into which the bolt is screwed does not have to be the nut, and may be a member provided with a female screw in advance.

The second thread and the third thread do not have to be provided on the tip end side of the bolt, and may be provided, for example, close to the tip end side in the middle of the shaft of the bolt.

The numbers of pitches of the second threads and the third threads may be 1 or 2, or 3 or more. However, if the numbers of pitches of these threads increase, the tip of the bolt protruding from the female screw in the fastened state will be longer, and the bolt will be heavier. For this reason, when the bolt is used for vehicles such as a wheeled vehicle, it is preferable to set the numbers of pitches to about 3 or less.

REFERENCE SIGNS LIST

1 Bolt
2 Shaft
3 Head
5 Female screw
7 Fastening structure
11 First thread
12 Second thread
13 Third thread
19 Notch

The invention claimed is:

1. A bolt for fastening comprising: a shaft; and
a head having a length in a direction perpendicular to the central axis longer than the diameter of the shaft, wherein
a first thread is provided on a head side of the shaft,
a second thread provided larger in diameter than the first thread and a third thread provided wider than the first thread are provided on a tip end side of the shaft, a diameter of a second thread is larger than a diameter of a third thread and the third thread is provided wider than the second thread, and only the third thread is provided with a notch.

2. The bolt according to claim 1, wherein a thread having a friction coefficient stabilizer applied thereto is provided on the tip end side of the shaft.

3. A fastening structure in which the bolt according to claim 1 and a female screw are threadedly engaged with each other for fastening.

* * * * *